3,222,759
PROCESS FOR FABRICATING A CABLE SYSTEM
Wallace B. MacKenzie, Yonkers, N.Y., assignor to Phelps Dodge Copper Products Corporation, New York, N.Y., a corporation of Delaware
No Drawing. Filed July 23, 1962, Ser. No. 211,854
1 Claim. (Cl. 29—155.5)

This invention relates to an improved process for fabricating an electric power cable system. More particularly, this invention relates to an improvement in fabricating electric cable systems wherein the conductors of the cable are submerged in oil under pressure in a pipe line.

When fabricating a complete cable system, it is common practice to coat the inner surface of the conductor containing conduit or pipe to prevent corrosion prior to installation of the conductors and to facilitate the introduction of the conductors into the conduit. Typical of the coating materials are synthetic resins such as, for example, plasticized vinyl resin and more recently epoxy resin coatings. It has been found that the presence in the coating of oil extractable materials such as for example, catalyst residues, contaminate the oil to the degree that the electrical properties of the oil are adversely affected.

I have found that the aforementioned problem may be overcome by subjecting the coated pipe to a treatment with an oil, preferably the oil to be ultimately utilized in the complete cable system, prior to incorporation of the cable for a period of time sufficient to extract the contaminating residues from the surface coating, removing the contamination containing oil and subsequently, in a conventional manner, assembling the conductors, covering pipe and non-contaminated oil.

To further explain and illustrate the invention, the following example sets forth the process for treating a pipe having an epoxy resin coating.

*Example I*

Standard pipe, internally coated with ten mil thickness of an epoxy resin (Dearborn Dearclad—Dearborn Chemical Company) was treated as follows:

After the internal coating was completed and volatile solvents were substantially removed, the coated pipe was filled with oil of the same type to be used during the service life of the system, namely Suniso # 6, Sun Oil Company), and the pipe with one end closed and the other end connected to an expansion chamber was externally jacketed with Somastic (H. C. Price Company), so that the pipe and internal coating during the operation attained a temperature of at least 125° C., but not more than 175° C., for a period of at least ten minutes, but not more than 60 minutes. The contaminated oil was drained before cooling the coated pipe.

The degree of internal coating purification attained may be measured by comparing the 60 cycle percent power factor at 100° C. of the oil used for the purification with that of a second quantity of the same amount of oil used in a second cycle of purification. Infra-red absorption spectra of the oil may likewise be used to measure contamination.

While it is preferable to treat the pipe coating with the same oil that is to be employed in the complete cable system, it is to be understood that an oil having similar solvent action may be utilized.

I claim:

A process for fabricating a cable system comprising the steps in sequence of lining the interior of an outer covering with a resin coating, said resin coating containing contaminants therein, subjecting the inner resin coated surface of the outer covering to a solvent selectively chosen to have the solvent properties of the oil to be used in the completed cable system, said solvent being stable at temperatures of 125° C. to 175° C., heating said outer covering to a temperature between 125° C. and 175° C. for a period of 10 to 60 minutes in the presence of said selectively chosen solvent thus removing all contaminants in said resin dissolvable in said solvent, removing said selectively chosen solvent containing the dissolved contaminants, inserting into said outer covering a plurality of conductors and filling said covering with oil under pressure.

References Cited by the Examiner

UNITED STATES PATENTS 2,123,434  7/1938  Paulson et al.
2,482,904  9/1949  Dougherty et al. _____ 134—22

FOREIGN PATENTS 1,151,413  8/1957  France.
   11,048  6/1891  Great Britain.
   29,757  12/1913  Great Britain.

JOHN F. BURNS, *Primary Examiner.*

JOHN P. WILDMAN, E. JAMES SAX, LARAMIE E. ASKIN, *Examiners.*